United States Patent [19]

Feldman et al.

[11] Patent Number: 4,546,860
[45] Date of Patent: Oct. 15, 1985

[54] BRAKE ACTUATOR DEVICE WITH AUTOMATIC SLACK ADJUSTER

[75] Inventors: Joachim Feldman, Neustadt; Andreas Oberländer, Hanover, both of Fed. Rep. of Germany

[73] Assignee: Wabco Fahrzeugbremsen GmbH, Hanover, Fed. Rep. of Germany

[21] Appl. No.: 582,974

[22] Filed: Feb. 23, 1984

Related U.S. Application Data

[62] Division of Ser. No. 297,478, Aug. 28, 1981, Pat. No. 4,461,371.

[30] Foreign Application Priority Data

Aug. 30, 1980 [DE] Fed. Rep. of Germany ....... 3032828

[51] Int. Cl.[4] ............................................. F16D 65/52
[52] U.S. Cl. .................. 188/71.4; 188/71.9; 188/72.3; 188/196 R

[58] Field of Search ............. 188/71.9, 71.8, 196 BA, 188/196 B, 196 A, 196 P, 196 D, 77 W, 77 R, 249, 259, 71.5, 366, 18 A, 72.4, 71.2, 367, 72.5, 71.3, 72.6, 71.4, 72.3, 73.2, 72.8, 196 R; 192/111 A

[56] References Cited

U.S. PATENT DOCUMENTS 4,325,466  4/1982  Klaue ................................. 188/71.4

FOREIGN PATENT DOCUMENTS 2646870  4/1978  Fed. Rep. of Germany ..... 188/71.4

Primary Examiner—Douglas C. Butler
Attorney, Agent, or Firm—G. J. Falce

[57] ABSTRACT

In a brake actuator device, wear of brake lining, which results in the increase of stroke of the brake actuator device consisting of piston and cylinder, is compensated by an adjuster which functions automatically when the brake is operated. The adjusting process takes place continuously and preferably at the onset of the actuation of the brake. A slip clutch turns the adjuster member which is connected by screw threads to the brake actuator piston to take up slack in the piston stroke. The slip clutch is driven by a rotary member that is in turn operated in response to actuation of the brake actuator.

4 Claims, 6 Drawing Figures

BRAKE ACTUATOR DEVICE WITH AUTOMATIC SLACK ADJUSTER

This is a division of application Ser. No. 297,478, filed Aug. 28, 1981, now U.S. Pat. No. 4,461,371.

BACKGROUND OF THE INVENTION

The invention pertains to a disk brake with full lining, and more particularly fluid-pressure-operated a full lining disk brake having an automatic slack adjusting device.

A disk brake of this type with an automatic adjusting device, which automatically compensates for any increase in stroke due to the wear of the brake linings, is known through U.S. Pat. No. 4,026,391, assigned to the assignee of the present invention.

For this known disk brake the frictional force interaction of the adjustments presents a problem, caused by the necessity that the adjusting members have to be moved either by a spring or by pressure in order to initiate an adjustment step, since as a result of dirt or corrosion the frictional forces may be so high as to render the adjusting members immobile, thus hindering or even preventing the automatic adjustment.

Another difficulty in connection with the already known disk brake adjusting device may be seen in the fact that an adjusting step may be initiated even with maximum piston stroke, making a large return stroke necessary. It has to be taken into account here that the adjustment in the event of a full braking action is being initiated with simultaneous maximum and thermal expansion of the housing. For this braking situation the return stroke has to be designed in such a way that it is great enough, so that when the elastic and thermal expansion is restored, the tightening device is not being clamped, but rather that a residual clearance is being maintained. Although in the majority of cases the adjusting step is obtained even with standard braking actions, the device has to be designed for the return stroke as described for the maximum braking action, which automatically results in a greater piston travel and a correspondingly higher energy consumption.

SUMMARY OF THE INVENTION

The object of the invention, therefore, is to create a disk brake of the type mentioned initially having an automatic adjusting device to compensate for brake lining wear, which does not have the described disadvantages of the already known adjusting device. The foregoing objective is fulfilled according to the present invention by providing a brake adjuster which effects the continuous adjustment of the disk brake, where the forces required for the actuation of the adjustment process are provided by the brake piston, thus producing considerably greater forces which more easily release any parts that might be stuck due to contamination or corrosion.

The adjustment point is set to the onset of the transfer of force, so that the adjustment process is terminated when the braking forces start to build up. The subsequent elastic and thermal expansion of the housing does not result in an increase of the adjusting step, meaning that the prescribed piston return stroke and the corresponding clearance may be kept small.

During each braking action an adjustment step can be performed automatically, which guarantees a continuous adjustment taking place in small steps.

BRIEF DESCRIPTION OF THE DRAWINGS

The invention is described in more detail with reference to the drawings in which.

DESCRIPTION AND OPERATION

Figure 1A:
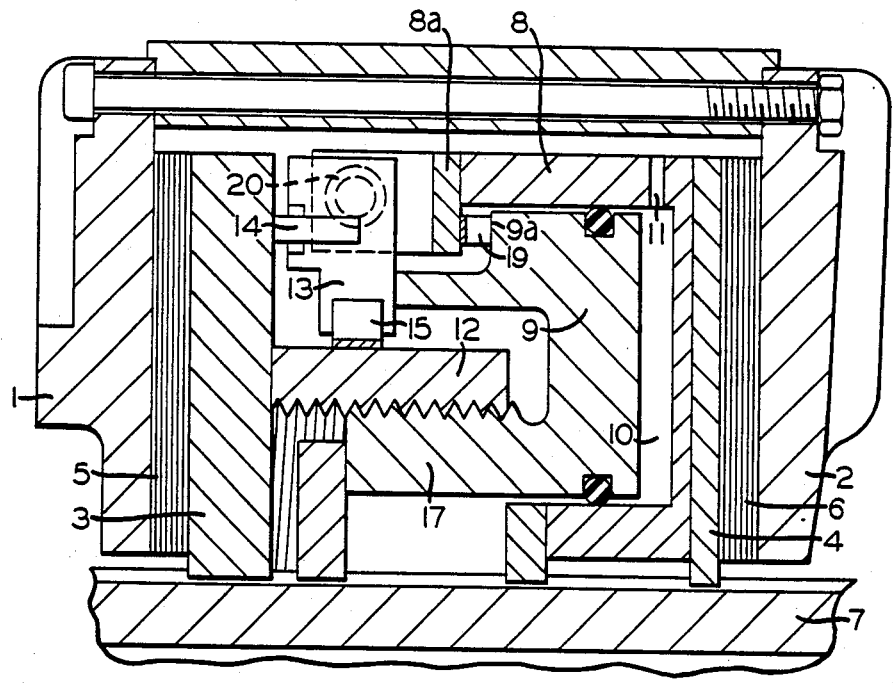
FIGS. 1a and 1b are sectional elevation and plan views of a pneumatic disk brake with a wear adjuster acting via inclined planes

The housing of a disk brake comprised of two brake disks 1,2 is screwed to the hub of a vehicle axle not shown here. The fixed parts of the brake consist of brake rings 3,4 with friction brake linings 5,6 attached thereto, which during braking are in frictional contact with the rotating brake disks 1,2 and which in the direction of rotation are stationary mounted so as to freely move axially to a brake bracket 7 which is attached to an axle flange not shown here.

The brake-operating device consists of an actuator device located between the brake rings 3,4, which is being formed by a cylinder 8 and an annular piston 9 which is mounted in this cylinder so as to move axially and is sealed with sealing rings.

An annular chamber 10 located between the cylinder 8 and the annular piston 9 is connected to a brake valve, not shown here, via its connection 11.

An automatic adjuster, which mainly is comprised of a threaded sleeve 12 and a transfer element 13,13a is interposed between the annular piston 9 and the brake ring 3 assigned to this annular piston 9.

The transfer element, which moves axially with the stroke of the piston, is comprised of three individual elements 13a distributed evenly over the periphery of a ring 13. The three elements 13a of the transfer element are provided with inclined friction surfaces which contact correspondingly designed inclined friction surfaces of formations 14 of brake ring 3 (compare FIG. 1b).

A slip clutch designed as tension band 15 is attached to one of the elements 13a and encircles the threaded sleeve 12, which makes possible the transmission in a peripheral direction to the threaded sleeve 12 of the motion produced during a stroke action of the rotary piston 3 by the mutual sliding of the two inclined surfaces of the parts 13a. The tension band 15 is pretensioned via spring 16 located at one of the mounting ends and itself supported at the transfer element 13,13a. The thread at the inside diameter of the threaded sleeve 12 engages with a corresponding thread of a formation 17 of the annular piston 9, so that a stroke of the annular piston 9—via the inclined surfaces 13a, 14 and via the tension band 15—causes a corresponding stroke motion of the threaded sleeve 12 in an axial direction toward the brake ring 3.

A corrugated spring 18 (refer to FIG. 2) located between the tension band 15 and the ring 13 is provided for the return of the tension band 15 to its original position following the axial movement of the threaded sleeve 12.

For the purpose of stabilizing the annular piston 9 during the brake release position a corrugated spring 19 acting as a return spring is located between a frontal area 9a of the annular piston 9, which opposes the frontal area forming the chamber 10, and a bar-shaped formation 8a of the cylinder 8 which runs vertically.

A return spring 20 acting upon the outside diameter of the transfer element 13,13a in a peripheral direction is provided for the purpose of turning the transfer element 13 in a peripheral direction. A crossbar 21 located at the vertical formation 8a of the rotary cylinder 8 and a contact surface at ring 13 or element 13a, respectively, serve to support the spring 20.

The automatic adjuster functions as follows:

When one of the brake valves is being operated the chamber 10 is supplied with compressed air via the connection 11. On the one side the brake lining 6, due to the stroke movement of the brake cylinder 8, is being forced against the rotating brake disk 2, and on the other side the stroke movement of the annular piston 9 causes the brake lining 5 to be forced against the rotating brake disk 1.

Even before the onset of the braking action the transfer element 13, 13a is being moved in an axial direction due to the stroke movement of the rotary piston 9. The elements 13a with their inclined surface slip off the inclined surface of the formation 14 of the brake ring 3 and are subject to an additional motive component in a peripheral direction. The tension band 15, which is attached to the transfer element 13, 13a and is in place about the threaded sleeve 12, as a result of the rotation of ring 13 tightens around the threaded sleeve 12 and thus transmits this rotational movement to the threaded sleeve 12, causing the latter to be moved in the same axial direction in addition to the stroke of the annular piston 9 until it makes contact with the brake ring 3. Through the force of engagement between the annular piston 9, the threaded sleeve 12 and the brake ring 3, the rotary motion or the adjusting process, respectively, is terminated.

After the braking action or respectively, after the bleeding of chamber 10, the annular piston 9 is forced back into its original position through the tension of the corrugated spring 19. In so doing, the transfer element 13, 13a—through the tension of the spring 20—is being turned in a peripheral direction until the inclined surfaces of parts 13,14 make contact again. During this rotation the tension band 15 is being released from the threaded sleeve 12, so that this does not slacken back (to be influenced by thread friction, tension band suspension). At the same time the corrugated spring 18 moves the tension band 15 in an axial direction into the original position relative to the ring 13.

When play develops between the threaded sleeve 12 and the brake ring 3 as a result of lining wear, the described adjusting process is repeated again and again when the brake is operated.

Figure 2:
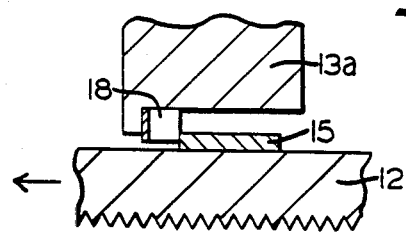
FIG. 2 is a partial section view of FIG. 1 showing the tension band of the wear adjuster.
Figure 3:
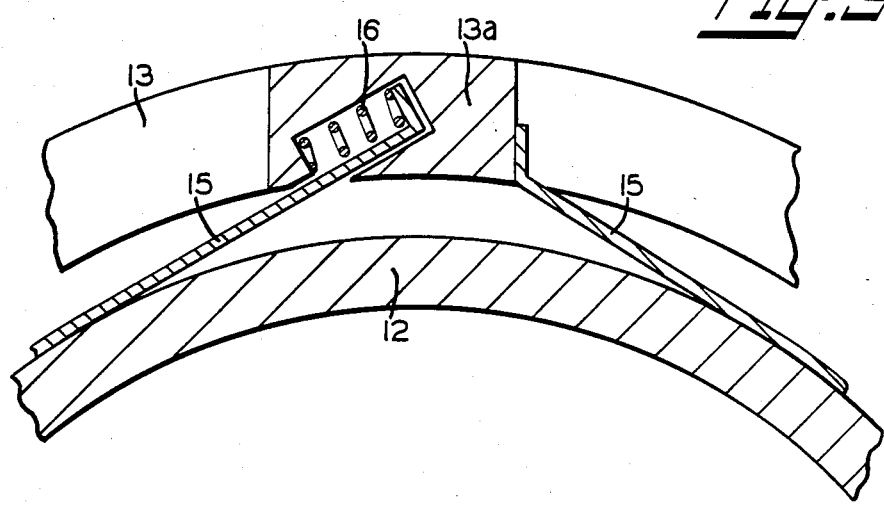
FIG. 3 is a lateral view of FIG. 2, and FIGS. 4a and 4b are sectional elevation and plan views of a disk brake as in FIG. 1, having a different wear adjuster in the form of a toggle lever.

During the rotation of the transfer element 13,13a and the rotational movement thus transmitted to the threaded sleeve 12 via the tension band 15, the threaded sleeve 12 shifts axially to the transfer element 13, 13a in the direction of the arrow as in FIG. 2.

In order to keep as small as possible the slippage between the transfer element 13,13a and the threaded sleeve 12 during the initiation of the rotational movement, the additional spring 16 is installed at one end of the tension band 15, in order to pretension the tension band 15 in a peripheral direction with the force of this spring 16.

Figure 1B:
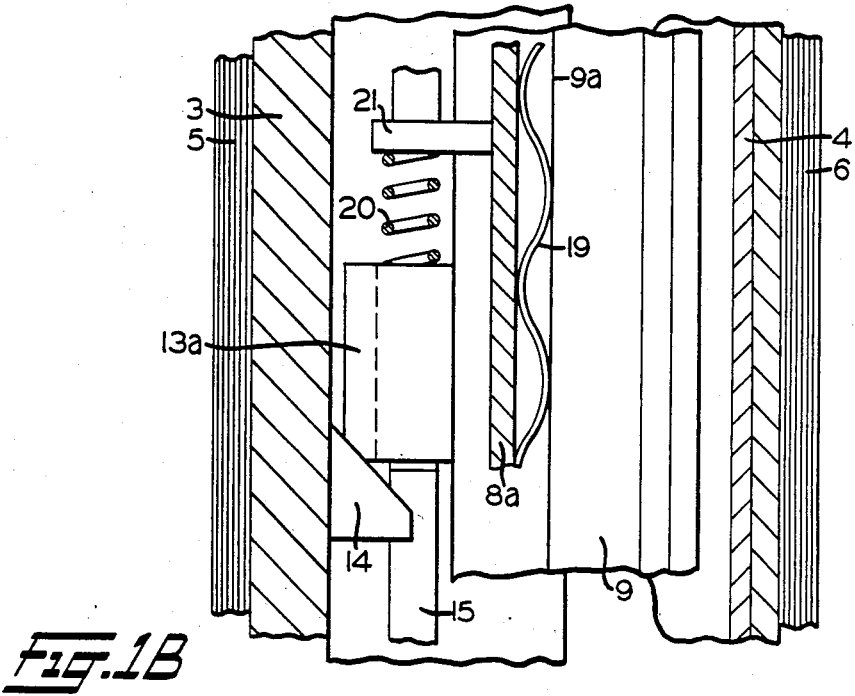
Figure 4A:
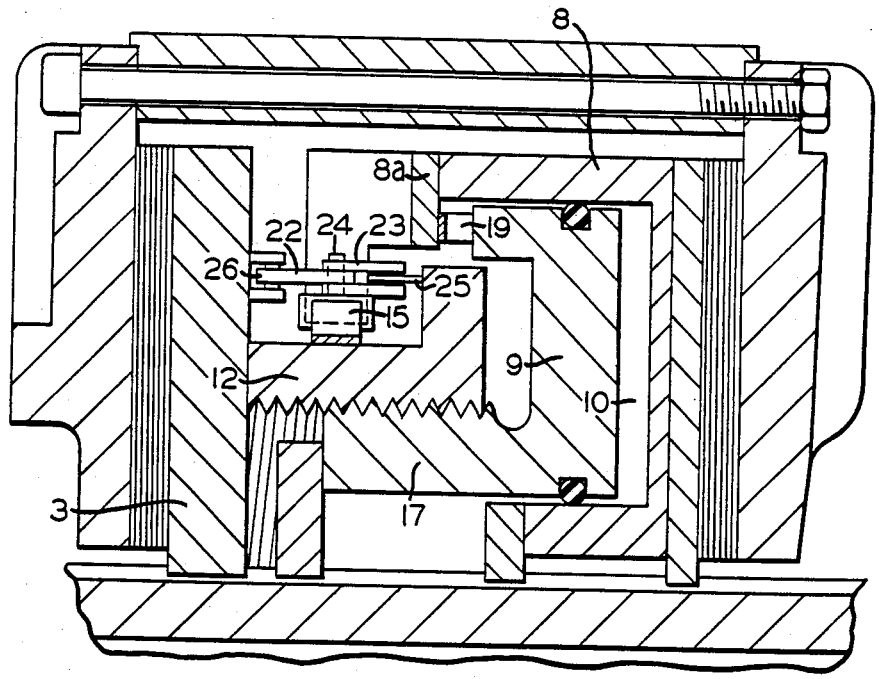
Figure 4B:
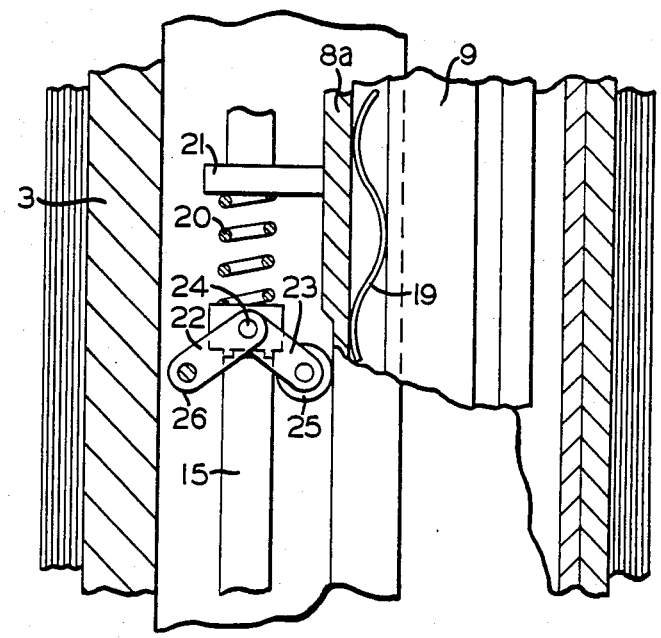

In the example shown in FIG. 4 the inclined surfaces 13, 14 of FIG. 1 are replaced by a toggle lever mechanism which is formed by two elbow lever arms 22, 23, a tie bolt 24 flexibly joining the two levers 22, 23, plus a roller 25 attached to one end of the first elbow lever arm 23, with this elbow lever mechanism being unilaterally mounted so as to rotate on the brake ring 3 with the end 26 of the second elbow lever arm 22. The tension band 15 is attached to the tie bolt 24 of the two elbow lever arms 22, 23. In this instance the rotating motion of the threaded sleeve 12 is obtained through the change in the angular position of the two elbow lever arms 22, 23 instead of by means of the inclined surfaces; the rotational movement of the threaded sleeve 12 is being effected via the tension band joined at the tie bolt 24. Otherwise the function is performed by means of the same components as illustrated and described in FIG. 1, which in FIG. 4 were given the same reference numbers as in FIG. 1.

We claim:

1. A brake device including at least one disc member that is connected to the axle of a vehicle wheel for rotation therewith and at least one brake member having friction linings axially movable into and out of engagement with said at least one disc member, said brake device comprising:
   (a) a brake actuator movable in a brake application direction in response to the supply of fluid under pressure thereto to force said at least one brake member toward engagement with said at least one disc member;
   (b) expansion means for taking up slack between said at least one brake member and said at least one disc member due to wear of said friction linings comprising:
      (i) a sleeve between said brake actuator and said at least one brake member, said sleeve being threadedly connected to said brake actuator so as to be axially adjustable relative thereto;
      (ii) a transfer means interposed between said brake actuator and said brake member for converting axial movement of said brake actuator into rotation of said sleeve when actuated in said brake application direction so as to effect said relative axial adjustment between said brake actuator and said sleeve, said transfer means comprising:
         (a) a toggle lever having a first lever arm with a roller at one end thereof engageable with said brake actuator and a second lever arm pivotally connected at one end thereof to said brake member, said first and second levers being pivotally connected to each other at their respective other ends; and
      (iii) a tension band surrounding said threaded sleeve to provide frictional engagement therewith when said brake actuator is actuated in said brake application direction and to release said frictional engagement when said brake actuator is moved in the opposite direction, said tension band being fixed at one end thereof to the other ends of said first and second lever arms of said toggle lever; and
      (iv) a spring connected between the other end of said tension band and said toggle lever so as to maintain said tension band in a prestressed condition.

2. Brake device as recited in claim 1, wherein said brake actuator comprises:
   (a) an annular cylinder;

(b) an annular piston axially disposed in said cylinder and sealed with sealing rings; and (c) an annular chamber located between said cylinder and said piston to which fluid pressure is supplied.

3. Brake device as recited in claim 2, further comprising a corrugated return spring disposed between a face of said piston opposing the face thereof subject to said supply fluid pressure and a face of a formation of said cylinder opposing the face thereof subject to said supply fluid pressure to urge said brake actuator in a brake release direction.

4. Brake device as recited in claim 1, further comprising an annular corrugated spring disposed between said tension band and said transfer means to exert an axial force therebetween.

* * * * *